E. C. JOSEPH.
CASTER.
APPLICATION FILED DEC. 8, 1917.
1,305,547.
Patented June 3, 1919.
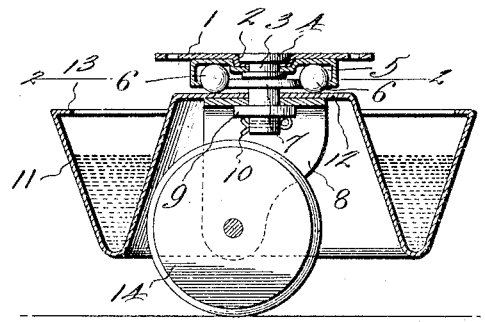
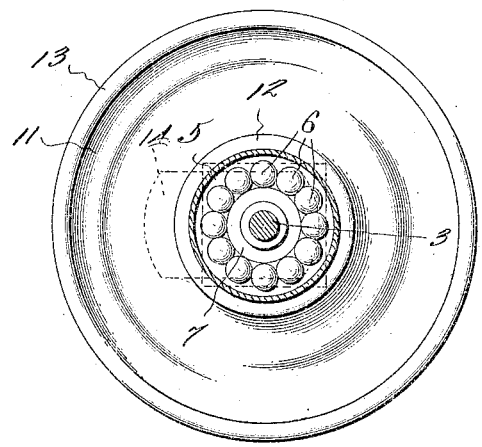
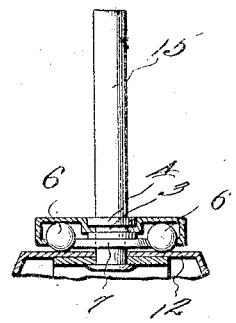
Inventor
E. C. Joseph,
Witnesses
By Victor J. Evans
Attorney

UNITED STATES PATENT OFFICE.

EDMOND C. JOSEPH, OF GARYVILLE, LOUISIANA.

CASTER.

1,305,547.  Specification of Letters Patent.  Patented June 3, 1919.

Application filed December 8, 1917. Serial No. 206,307.

*To all whom it may concern:*

Be it known that I, EDMOND C. JOSEPH, a citizen of the United States, residing at Garyville, in the parish of St. John the Baptist and State of Louisiana, have invented new and useful Improvements in Casters, of which the following is a specification.

This invention relates to a furniture caster and it consists in the novel features hereinafter described and claimed.

An object of the present invention is to improve the construction of casters and to provide a cheap, practical and inexpensive caster designed to be applied to the legs of articles of furniture and provided with means to prevent insects from crawling up the legs.

With this object in view the caster includes a plate adapted to be applied to the leg of an article of furniture. A stud passes through the plate and a ball race is located under the plate and surrounds the stud. Balls are retained in the race and a washer is mounted upon the stud and is adapted to retain the balls in proper relation in the race. The caster frame is journaled upon the lower portion of the stud and carries a caster wheel. A pan is provided with an intermediate flat portion which lies upon the intermediate portion of the caster frame and in close contact with the same and the said balls bear directly against the upper surface of the intermediate portion of the pan. The pan is provided at its upper edge with an inclined flange and is adapted to retain oil or other suitable liquid which will destroy insects.

In the accompanying drawing:—

Figure 1 is a transverse sectional view of the device.

Fig. 2 is a cross sectional view on the line 2—2 of Fig. 1, and

Fig. 3 is a sectional view illustrating a slight modification.

As illustrated in the accompanying drawing, the device comprises a plate 1 which is adapted to be applied to the lower end of the leg of an article of furniture. The plate 1 is provided with a centrally located depression 2 and a stud 3 passes through the plate 1 at the bottom of the depression and the center thereof. A head 4 is provided upon the stud 3 and is housed within the depression 2 of the plate 1. A race plate 5 is located under the plate 1 and surrounds the stud 3. Bearing balls 6 are retained under the plate 5. A washer 7 is mounted upon the stud 3 and serves to hold the balls 6 in proper position with relation to the race 5.

A U-shaped caster frame 8 is journaled upon the lower portion of the stud 3 and is held thereon by means of a washer 9 and a cotter pin 10 of conventional pattern. A pan 11 is used in conjunction with the structure hereinbefore described and the said pan is provided at its center with a flat portion 12 which lies flat upon the intermediate portion of the caster frame 8 and in close contact with the same. The balls 6 bear directly against the upper surface of the flat portion 12 of the pan 11. The inner and outer sides of the pan 11 are cone shaped and disposed at acute angles with respect to each other. The pan 11 is provided at its upper outer edge with an inturned flange 13. The said pan 11 is adapted to retain oil or any other liquid which will destroy insect life. A caster wheel 14 is journaled in the lower portion of the frame 8 in a usual manner and the lower portion of the said wheel 14 extends below the bottom of the pan 11, while the upper portion of the said wheel is housed within the inner wall of the said pan as best shown in Fig. 1 of the drawing. If desired, the stud 3 may be extended as at 15 and the said extension may be inserted up in the leg of the article of furniture to which the device is applied.

It will be seen that a caster of simple and durable structure is provided and that a ball bearing is interposed between the plate of the caster and the frame which carries the wheel. The balls of the said bearings bear against the flat intermediate portion of the pan which in turn bears against the intermediate portion of the caster frame and lies in close contact with the same. Therefore a durable and strong structure is provided and the parts cannot be bent or twisted out of shape. Insects which may attempt to crawl up the leg of the article of furniture will be compelled to ascend the wheel 14, then the frame 8 and they must pass along the under surfaces of the sides of the pan and when they move over the flange 13 they will fall into the pan and into the liquid which is contained therein whereby they will be destroyed.

From the foregoing description taken in conjunction with the accompanying drawing it will be seen that a combined caster and insect destroyer of simple and durable structure is provided and that the same may serve all of the necessary functions as a furniture caster and in addition will effectually destroy or kill any insects which may attempt to gain access to the upper portion of the article of furniture by crawling from the floor and along the leg to the upper portion of the furniture.

Having described the invention what is claimed is:

A device of the character described comprising an attaching plate formed to provide a central depression provided with a central opening, a second plate circular in form disposed beneath said first named plate and formed with a central depression conformingly receiving said first named depression, said second named depression being provided with a central opening registering with said first named opening, said second named plate being peripherally bent downwardly and having its lower edge terminating in an inwardly extending flange to form a ball recess, a stud having an enlarged head engaged within said first named depression and flush with the upper surface of said attaching plate, said stud extending through said registering openings, a washer upon said stud extending toward said flange, balls disposed within a recess formed by said second named plate and retained by said washer, an inverted U-shaped caster frame disposed beneath said last named plate member and apertured for the passage of said stud, a washer upon said stud and engaging the lower surface of said caster frame, means for holding said last named washer in position, and a roller journaled within said caster frame.

In testimony whereof I affix my signature.

EDMOND C. JOSEPH.